Aug. 13, 1935.   J. P. CLIFTON   2,011,333
VALVE
Filed Sept. 21, 1931

Inventor
James P. Clifton
By Murray and Zugelter
Attorneys

Patented Aug. 13, 1935

2,011,333

UNITED STATES PATENT OFFICE 2,011,333

VALVE

James P. Clifton, Blanchester, Ohio

Application September 21, 1931, Serial No. 564,001

1 Claim. (Cl. 137—53)

This invention relates to a piston type valve or by-pass, commonly known as a relief valve, adapted particularly for use with oil hydraulic pumping units wherein a specific pressure must be maintained.

An object of the invention is to provide a valve simple and efficient in construction and operation, Another object is to provide a valve so constructed that pounding or "chattering" upon closure of the valve is eliminated.

Another object is to produce a valve of the kind described which is adjustable for use with a wide range of liquid pressures.

These and other objects are attained by the means described herein and set forth in the accompanying drawing, in which.

Figure 1:
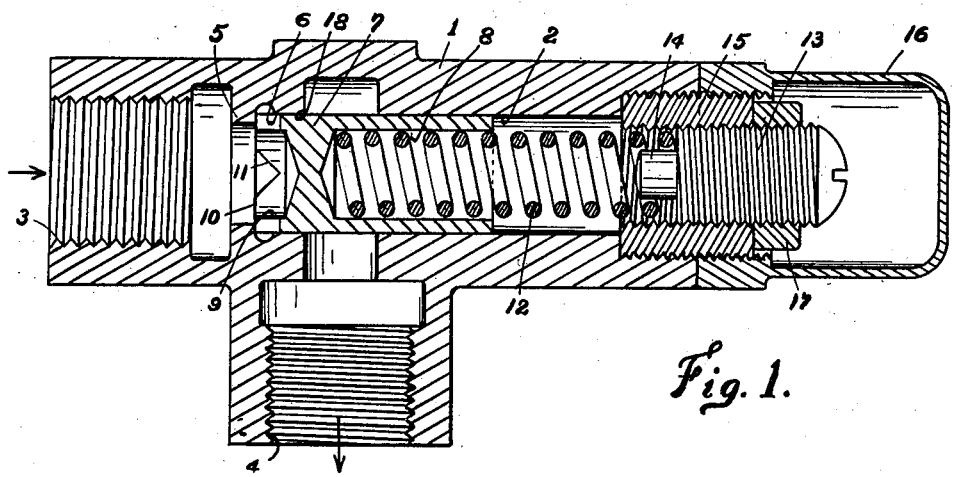
Fig. 1 is a longitudinal cross-sectional view of the valve of this invention.

The valve comprises the elongated casing 1 having the longitudinally extending chamber 2 therein terminating at one end of the casing in the inlet port 3 and having in communication therewith the laterally projecting outlet port 4, the latter being disposed at substantially right angles with the inlet port 3. Adjacent the inner end of the inlet port 3, the interior of the casing 1 is formed to provide the annular shoulder 5 projecting inwardly of the chamber 2, and forming the valve abutment. A second annular shoulder 6, spaced inwardly of the chamber 2 relative to the shoulder 5, is formed. Said shoulder 6, which forms the valve seat, projects inwardly of the casing chamber to a less extent than the valve abutment 5.

The valve member 7 of this invention is of the piston type and, as shown in Fig. 1, comprises a cylindrical body having an enlarged annular chamber 8 throughout the greater part of its length and opening upon one end of the body, and the smaller annular chamber 9 formed in the opposite end of said body. The edge 10 at the lower end of the valve member and within which the chamber 9 is formed, is provided with serrations 11. The number and size of these serrations may be modified but as shown herein there are four serrations provided and of such size that an extent of the bottom edge of the valve member spaces one serration from the next, the size of the serrations, as shown, being such that they extend to within a short distance of the base of the chamber 9.

The valve member 7 is adapted to move inwardly and outwardly of the valve seat 6 and to seat upon the valve abutment 5. It is held in this position by a coil spring 12 which is received within the chamber 8 of the valve member and which projects upwardly into the chamber 2. At its free end the coil spring 12 abuts a set screw 13 having a stud 14 thereon which engages the coil spring. The set screw 13 is threadedly received within a threaded collar 15 which projects outwardly of the casing 1 and which at its outer end is adapted to receive a cap 16 for covering and protecting the set screw 13. A suitable lock nut 17 may likewise be provided upon the set screw. It will be seen that the coil spring thus tensioned is adapted to urge the valve member 7 into contact with the valve abutment 5 and within the valve seat 6 and it is further apparent that this tensioning may be increased or decreased as desired by adjustment of the set screw 13.

In operation the liquid follows the course indicated by the small arrows in Fig. 1, it being understood that the valve member 7 is forced to the right of the valve as seen in Fig. 1 by the pressure of the liquid. Upon closure of the valve, a gradual diminution of the flow of liquid is effected due to the serrated formation of the bottom edge of the valve member. As this part of the valve moves within the innermost edge 18 of the valve seat 6, the liquid continues to flow through the serrations 11 which, due to their V-shaped formation, are gradually reduced in size until complete stoppage of the flow of liquid is attained and the valve member is seated upon its abutment 5. It will be seen that the innermost portions of the serrations 11 fall well below the innermost portions of the valve seat 6 so that there is no danger of leakage when the valve is closed. The elimination of an abrupt closure of liquid flow which heretofore has been the cause of pounding and "chattering" upon closure of valve of this type, is effected by means of the serrated valve member herein disclosed. The wear and tear upon the valve and all the associated parts is likewise obviated by the means of this invention.

Figures 2, 3:
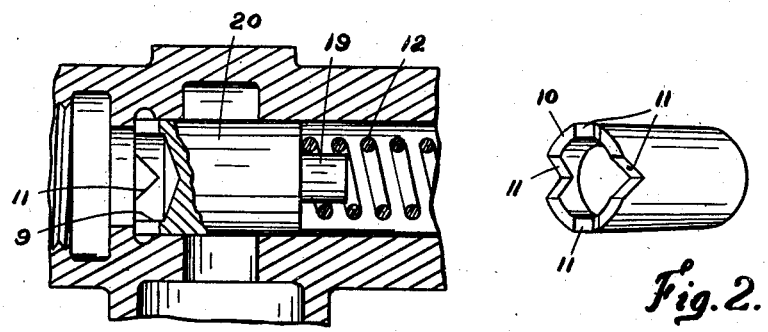
Fig. 2 is a detail view in perspective, of the valve member of the present invention.
Fig. 3 is a fragmentary cross-sectional view showing a modified form of the valve member.

In Fig. 3 a modification of the valve member is shown, wherein the spring 12 instead of having its lower end enclosed within the valve member as shown in Fig. 1, seats about a stud 19 provided upon the inner end of the modified valve member 20 which is solid except at its lower end where the chamber 9 and serrations 11 are provided as in the form heretofore described. The operation and adjustment is, of course, identical with the first form disclosed. The modified form of valve shown in Fig. 3 might prove preferable in instances where a heavier valve member is necessary to cope with a heavier type of fluid or a higher fluid pressure.

What is claimed is:

A valve for regulating liquid flow and comprising a casing having an inlet and an outlet port disposed substantially at a right angle with one another, a valve abutment projecting interiorly of the casing between said ports, a cylindrical valve seat projecting interiorly of the casing adjacent and spaced from said abutment, a piston type valve member slidably positioned in the casing in alignment with the inlet port and adapted to close said port by movement through said valve seat into contact with said abutment, said valve member in open position being adapted to be moved beyond the valve seat and clear of association therewith, said valve member being hollowed at its abutment end to provide a chamber and the edges forming said chamber being serrated whereby gradual diminution of liquid flow is effected upon closure of the valve, a spring in the casing urging the valve member toward its abutment, and means for regulating the pressure of the spring upon the valve member.

JAMES P. CLIFTON.